United States Patent [19]
Nishida

[11] Patent Number: 5,769,435
[45] Date of Patent: Jun. 23, 1998

[54] SHOPPING CART HAVING A BASKET AND BASKET VERTICAL SIDE WALL USED THEREIN, AS WELL AS METHOD OF ASSEMBLING SAID BASKET

[75] Inventor: Eitaro Nishida, Osaka, Japan

[73] Assignee: Yamato Sangyo Kabushiki Kaisha, Osaka, Japan

[21] Appl. No.: 607,559

[22] Filed: Feb. 27, 1996

[30] Foreign Application Priority Data

Feb. 28, 1995 [JP] Japan ................................ 7-001155 U
Feb. 28, 1995 [JP] Japan .................................... 7-039662

[51] Int. Cl.⁶ ................................................. B62B 39/00
[52] U.S. Cl. ................................. 280/33.991; 280/33.997
[58] Field of Search .................... 280/33.991, 33.992, 280/33.995, 33.996, 33.997; 220/4.28, 4.33, 4.34, 666, 668, 676, 4.08

[56] References Cited

U.S. PATENT DOCUMENTS 4,123,077   10/1978   Joseph ................................ 280/33.991
5,289,936    3/1994   Jones et al. ......................... 280/33.991

FOREIGN PATENT DOCUMENTS 3011018    6/1993   WIPO ............................... 280/33.991

Primary Examiner—Richard M. Camby
Attorney, Agent, or Firm—Nikaido, Marmelstein, Murray & Oram LLP

[57] ABSTRACT

A shopping cart having a basket includes a cart body which, in turn, includes a wheeled chassis and a basket supporting frame mounted to the wheeled chassis. A plurality of discrete panel members, fittable to the basket supporting frame for making up the basket, include a pair of side panel members and a bottom panel member, each of the side panel members including a first wall and a second wall which are integrally made of plastic in such a manner as to have a generally L-shape in plan. The first wall makes up a part of a front wall of the basket, the second wall makes up a part of a front wall thereof, and the bottom panel member makes up a bottom wall thereof.

18 Claims, 11 Drawing Sheets

SHOPPING CART HAVING A BASKET AND BASKET VERTICAL SIDE WALL USED THEREIN, AS WELL AS METHOD OF ASSEMBLING SAID BASKET

BACKGROUND OF THE INVENTION

This invention relates to a shopping cart, and more particularly to a shopping cart having a basket of a relatively large size which includes a plurality of discrete panel members.

A shopping cart of a conventional type carries various types of a basket, such as a metal basket and a plastic basket. The metal basket is welded or fixed via other conventional fixing means to a cart body having a basket supporting frame, and a plastic basket. In actual application, it is possible that a user directly places a purchased article in the basket, or first places the article to an independent basket, and then places this basket in a prefixed basket of the cart body.

However, the shopping cart having the metal basket as stated above has various problems as follows:

The metal basket is usually of a box-like shape, that is, it includes a front, a rear, lateral sides and a bottom. The metal basket of such a shape is formed by meshing wires in a latticelike pattern. Specifically, the bottom of the basket, having substantially a trapezoidal plan is first meshed with wires, and the wires extending from the bottom portion are upwardly and vertically bent to form vertical sides of the basket. The wires are cut at a predetermined height which corresponds to an upper end of the vertical sides of the basket by a grinder or the like, then the other wires cross the wires vertically extending from the bottom, and is spot welded.

In accordance with this arrangement, it may be unavoidable to manually form the vertical sides of the basket, and to subject the basket to a galvanizing treatment to avoid rust on the metal basket. These processes may increase the manufacturing cost of the basket. In addition, even though the wires have been subjected to the galvanizing treatment, a welded portion of the wire is likely to rust. This may deteriorate an appearance of the basket.

On the other hand, there is disclosed a shopping cart having the plastic basket, for example, in Japanese Patent Publication No. 63-41789, as illustrated in FIG. 12. The basket of this type includes a front panel member 41, two lateral side panel members 42 and a bottom panel member 43. These panel members are provided along respective edge portions with grooves, and fixed to a metal frame of the shopping cart via these grooves for making up the basket.

The basket of this type is disadvantageous in the fact that a relatively large number of parts including four discrete panel members should be prepared, and a basket body using those discrete panel members inherently has sharply angled corners at connecting portions between front and lateral side panel members 41 and 42. These corners may damage a display case, etc., in a shopping area if the shopping cart accidentally hits against them.

To assemble the basket of this type, it is necessary to form the grooves in the panel, into which the frame of the shopping cart is fitted. However, each panel member necessarily includes an undercut with regard to a panel surface. This requires a die of a slide-core type or the like for molding, which may increase the manufacturing cost of the basket. The manufacturing of the panels, particularly the side panels 42 with a relatively long groove involves a further difficulty in molding, since the grooves should be exactly shaped so as to be snugly fitted to lateral frames 45.

In actual use of the basket of this arrangement, since the panel members are fixed to the frame via grooves only, they are likely to be released from the frame via an impact from the outside. In addition, since the plastic lateral side panels 42 surround the frame 45 with their edge portions, they are likely to be damaged with the impact from the outside.

There is further provided a plastic basket of the type which is unitarily molded. This basket may solve the above problems, however, it needs a relatively large die for molding.

An object of the present invention is to provide a shopping cart having a plastic basket of an improved structure and a basket vertical wall used in the basket of the shopping cart, which is suitable for molding from technical and economical points of view.

Another object of the present invention is to provide a shopping cart having a plastic basket of an improved structure, a basket vertical wall used in the basket of the shopping cart, and a method of assembling the basket, which enable the basket to be securely fixed to a cart body, while avoiding the basket from being unexpectedly released from the cart body during the shopping cart is actually used.

SUMMARY OF THE INVENTION

In accordance with the above objects, a shopping cart having a basket includes a cart body which, in turn, includes a wheeled chassis and a basket supporting frame mounted to the wheeled chassis. A plurality of discrete panel members fittable to the basket supporting frame for making up the basket include a pair of side panel members and a bottom panel member, each of the side panel members including a first wall and a second wall which are integrally made of plastic in such a manner as to have a generally L-shape in plan. The first wall makes up a part of a front wall of the basket, the second wall makes up a lateral side wall thereof, and the bottom panel member makes up a bottom wall thereof.

The basket of the present invention is formed of three component parts only, that is, a pair of the side panel members and the bottom panel member. Specifically, the basket of the present invention can be molded by a relatively small die. Whereby, the basket of the present invention can readily be assembled in a cheam manner.

DETAILED DESCRIPTION OF THE PREFERRED EMBODIMENTS

Figure 1:
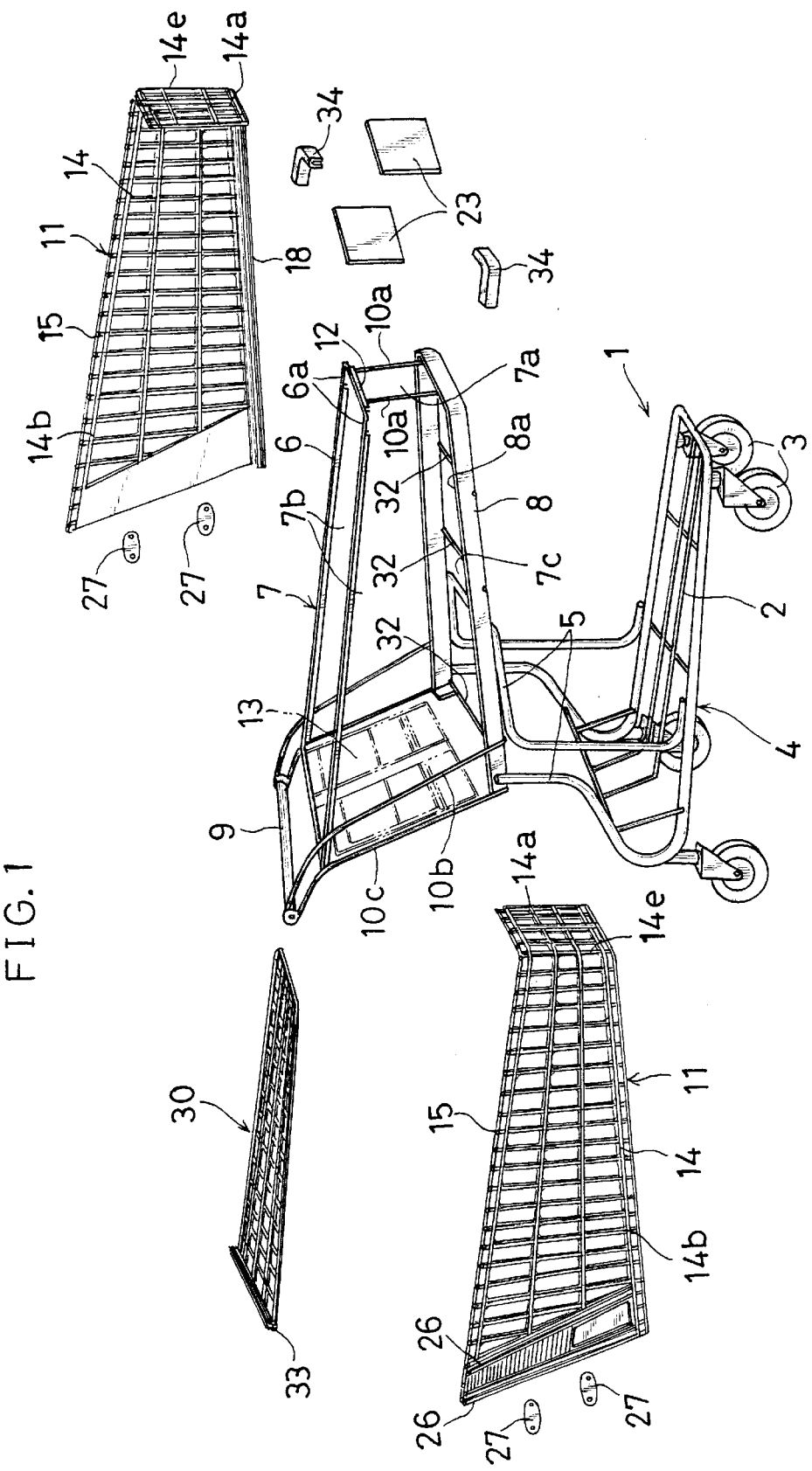
FIG. 1 is an exploded, perspective view of a shopping cart having a basket in accordance with one embodiment of the present invention.
Figure 2:
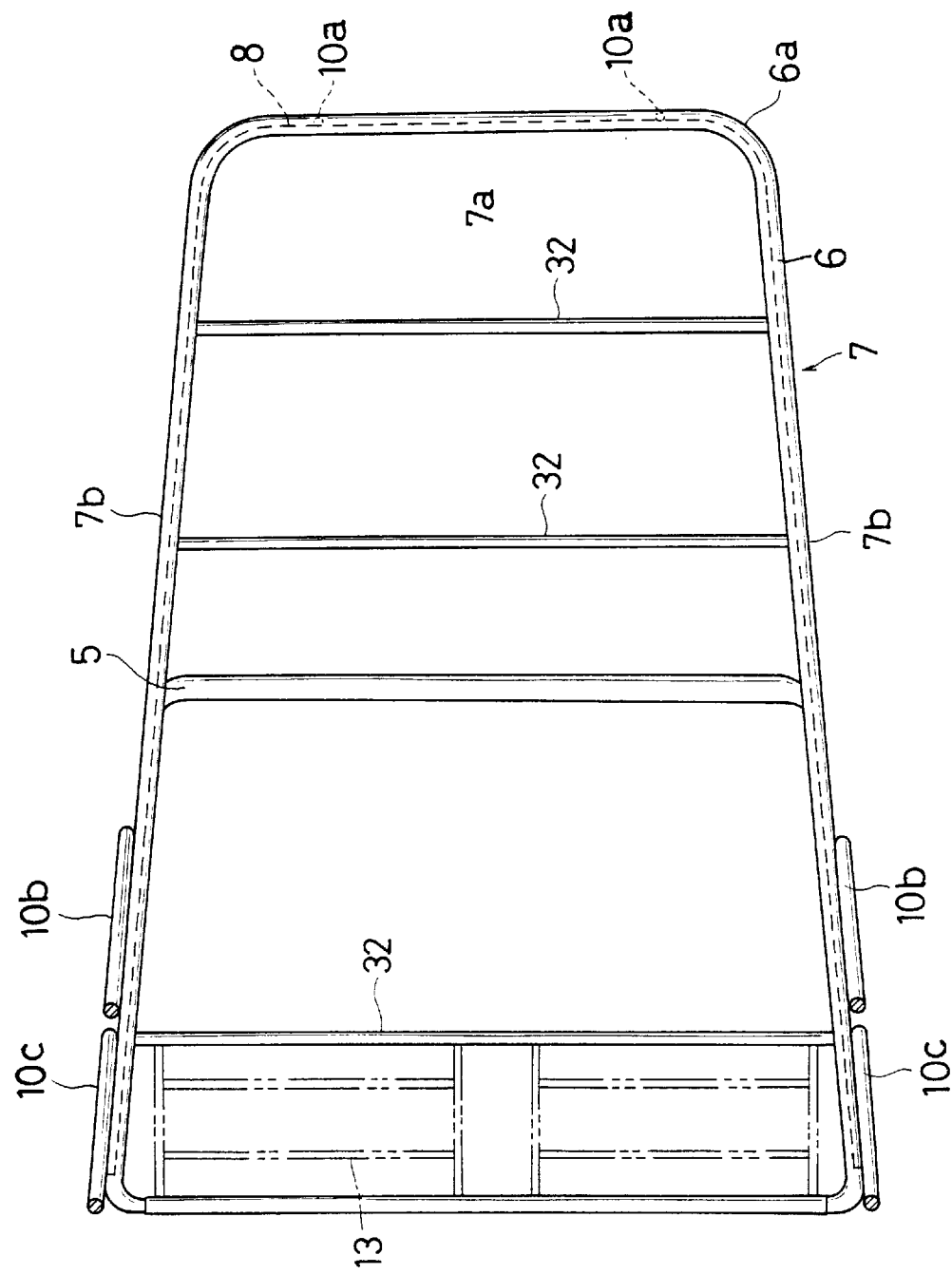
FIG. 2 is a plan view of a basket supporting frame.

Referring to FIG. 1, a cart body 1, which is made of iron, or other metals, includes a receiving table 2 at its lower portion to receive a basket or the like, a wheeled chassis 4 with four casters 3 provided at corners of the cart body 1, a basket supporting frame 7 connected to the wheeled chassis 4 via a supporting member 5. The basket supporting frame 7 includes an upper horizontal frame 6 and a lower horizontal frame 8. These frames are welded together, and are subjected to a resin coating treatment to avoid the occurence of rust thereon.

The lower horizontal frame 8 is formed from a band-like plate, and fixed to the supporting member 5 so that a flat surface of the frame 8 is vertically directed, and has a generally trapezoidal plan with a front edge extending transversely, and two lateral side edges advancing rearwardly apart from one another. A rear side of the lower horizontal frame 8 is open to outside.

The upper horizontal frame 6 has substantially the same outline as that of the lower horizontal frame 8, but is formed of a metal round bar. The upper and lower horizontal frames 6 and 8 are supported by a pair of front arms 10a, a pair of middle arms 10b and a pair of rear arms 10c at a front, middle but closer to a rear end, and the rear end of the basket supporting frame 7 so that the upper horizontal frame 6 extends forwardly and downwardly from its rear end at a slight angle relative to the horizontal. Accordingly, the upper and lower horizontal frames 6 and 8 become gradually closer to one another as they advance forwardly. The middle arms 10b and the rear arms 10c are terminated by a handle 9 above the upper horizontal frame 6. Between the upper and lower horizontal frames 6 and 8, the middle arms 10b and the rear arms 10c preferably extend straight.

The upper horizontal frame 6 is provided along its downwardly facing surface except for a curving corners 8a thereof and its peripheral portions with a side-panel fitting member 12 of a U-shape defining a groove downwardly open.

Figure 3:
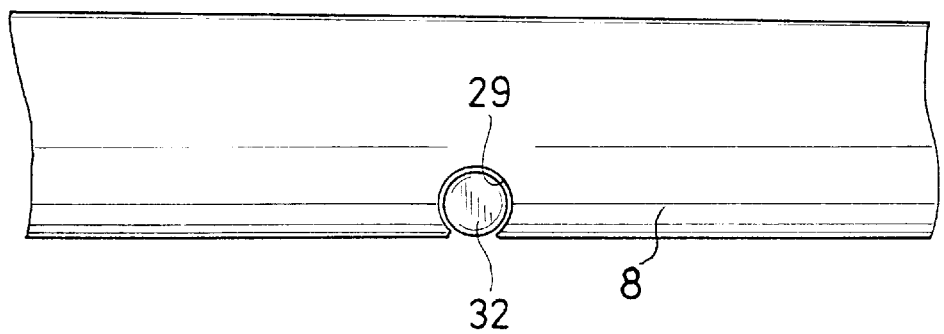
FIG. 3, on a somewhat larger scale, is a fragmentary side elevation illustrating a connecting state between a lower horizontal frame and a bottom-panel receiving bar.

A plurality of cut-outs 29, each having a rounded cross section, are provided in the lower horizontal frame 6 with predetermined spacing to each other to receive respective bottom-panel receiving bars 32, which are rigidly fixed to the lower horizontal frame 8. The bottom-panel receiving bars 32 fitted in the cut-outs 29 are welded together, as best shown in FIG. 3. With this arrangement, the bottom-panel receiving bars 32 are unlikely to drop from the cut-outs 29, thereby obtaining a structural strength which is tolerable against a certain given load from a bottom panel member of the basket or the like.

A babyseat compartment which also functions as a means for closing the rear side of the cart body 1, is indicated by the two-dot chain lines of FIG. 1, but is illustrated in a simple manner to omit detailed poritons since it is of a conventional structure. The babyseat compartment includes a seat portion made of plastic and a frame formed of an iron bar, and is foldable to close the rear side of the cart body 1, when it is not in use. In addition, the babyseat compartment has a pivotable structure so as to be upwardly pivotable when the shopping cart is nested with another shopping cart.

Figure 4:
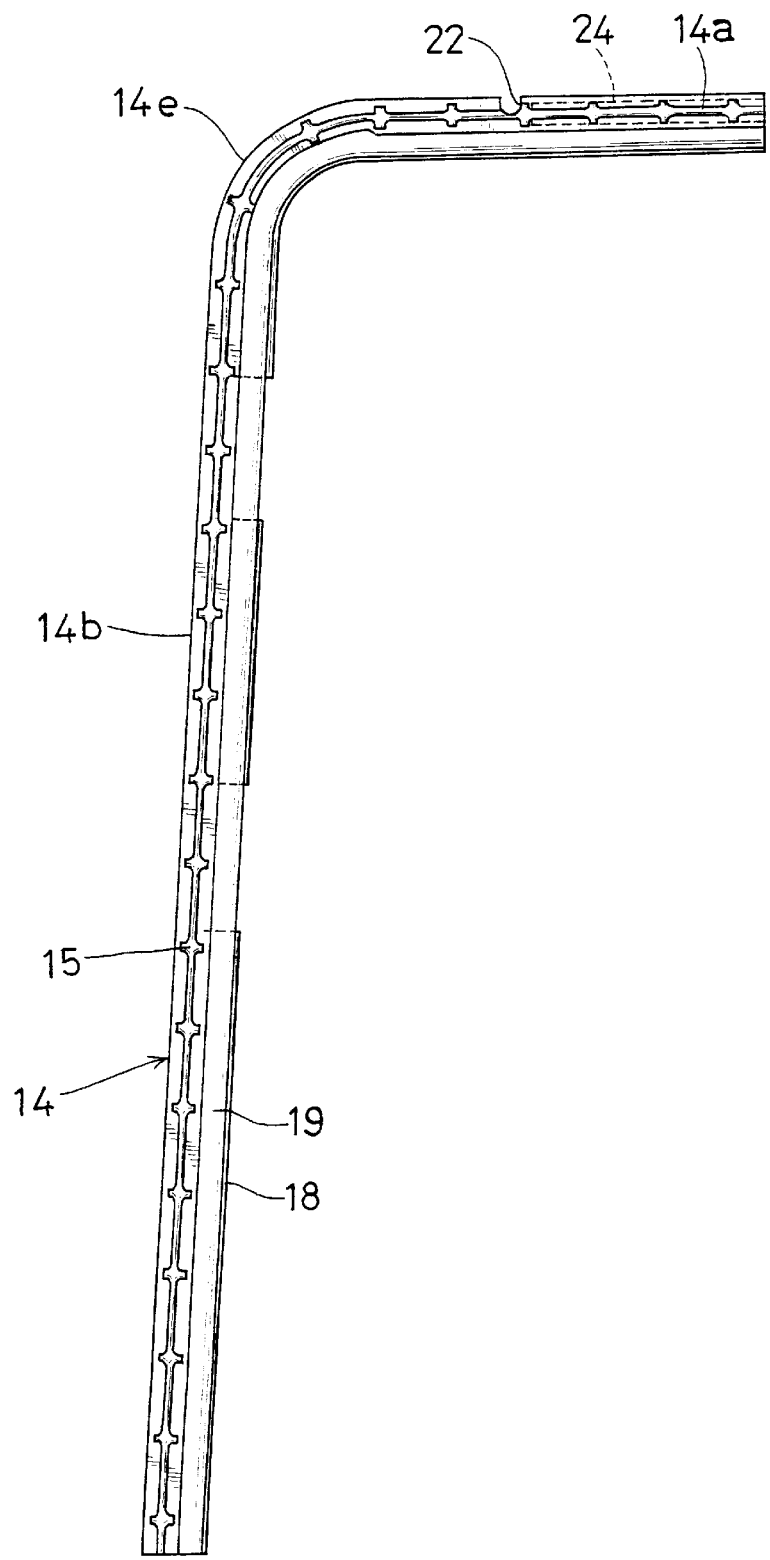
FIG. 4 is a plan view of a side panel member.

A vertical side wall 11 includes a pair of plastic side panel members 14, which are structurally symmetrical, and fittable to the basket supporting frame 7 with its front wall 7a and opposite lateral side walls 7b. Each side panel member 14 is formed into a generally L-shape in plan to have a first wall 14a and a second wall 14b for respectively making up a half of the front wall 7a and the lateral side wall 7b, and has a gradually curving corner 14e between the first and second walls 14a and 14b, as illustrated in FIG. 4. A pair of the side panel members 14 are structurally symmetrical. With this arrangement, a pair of the side panel members 14 make up the front and opposite lateral side walls 7a and 7b of the basket when assembled together.

Figure 5:
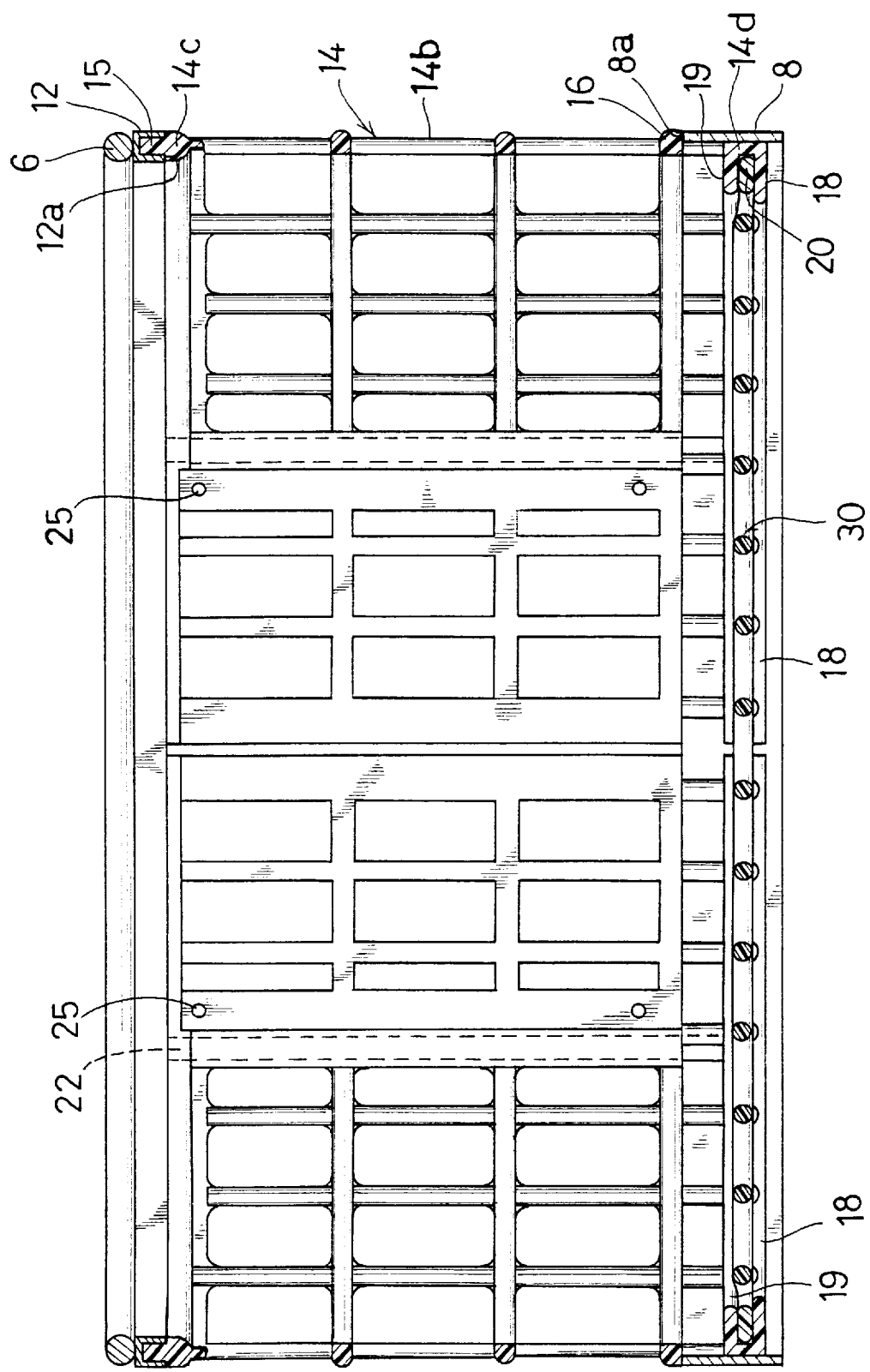
FIG. 5 is a cross sectional view of a basket with the side panel members and a bottom panel member attached to the basket supporting frame, as taken from the rear side of the basket.
Figure 6:
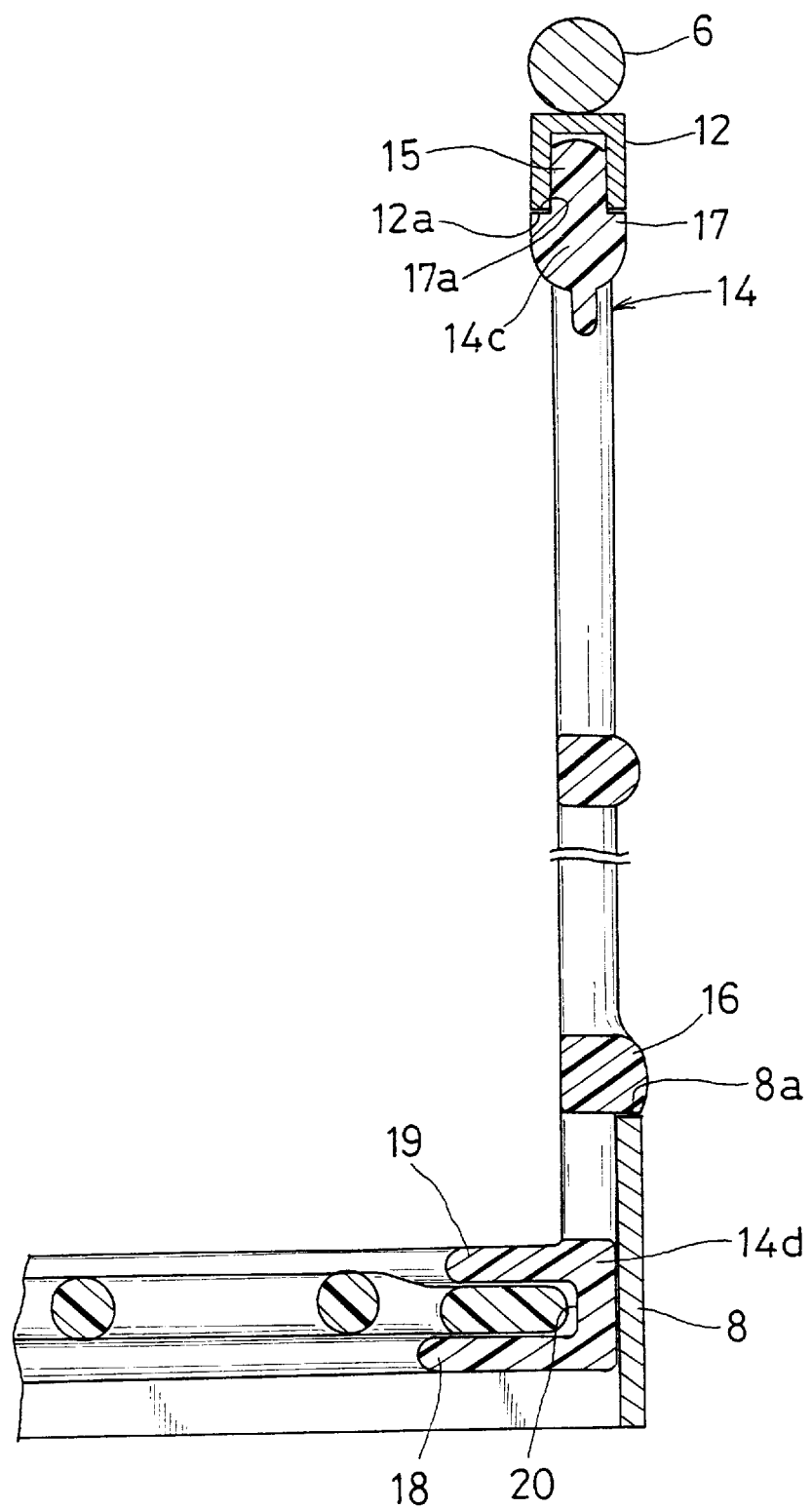
FIG. 6, on a somewhat larger scale, is a fragmentary cross sectional view of FIG. 5.

Referring to FIGS. 5 and 6, each side panel member 14 is provided along its upper edge 14c with a frange which can be fitted into a space within the groove of the side-panel fitting member 12 of the upper horizontal frame 6, and a shoulder 17 with a horizontal surface 17a which extends outwardly and inwardly from the side panel member 14 to abut against lower edges 12a of the side-panel fitting member 12.

Each side panel member 14 is further provided along its lower edge 14d and inner side with an auxiliary bottom extension 18 which extends inwardly, and is provided above the auxiliary bottom extension 18 with an inward extension 19 having a width narrower than the auxiliary bottom extension 18 to define an engaging concave 20. In this arrangement, the inward extension 19 may have the same width as or a width larger than that of the auxiliary bottom extension 18. An integrally formed protrusion 16 extends outwardly from the outer surface of the side panel member 14, thereby allowing the side panel member 14 to rest on an upper edge 8a of the lower horizontal frame 8.

Figure 7:
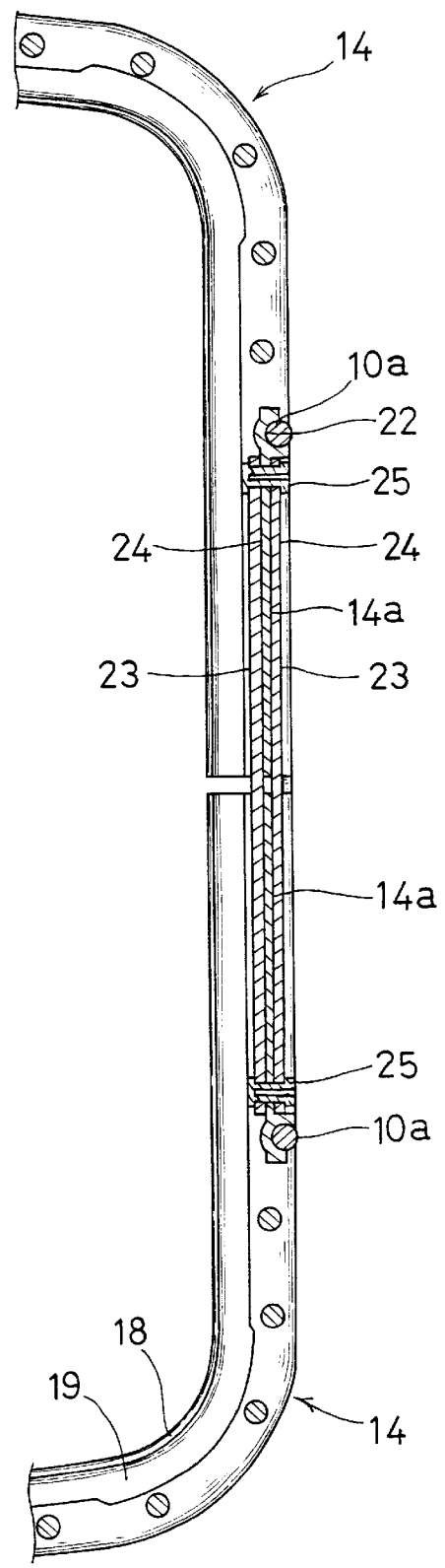
FIG. 7 is a cross sectional view illustrating a pair of the side panel members coupled together at their respective first walls via two coupling plates.
Figure 8:
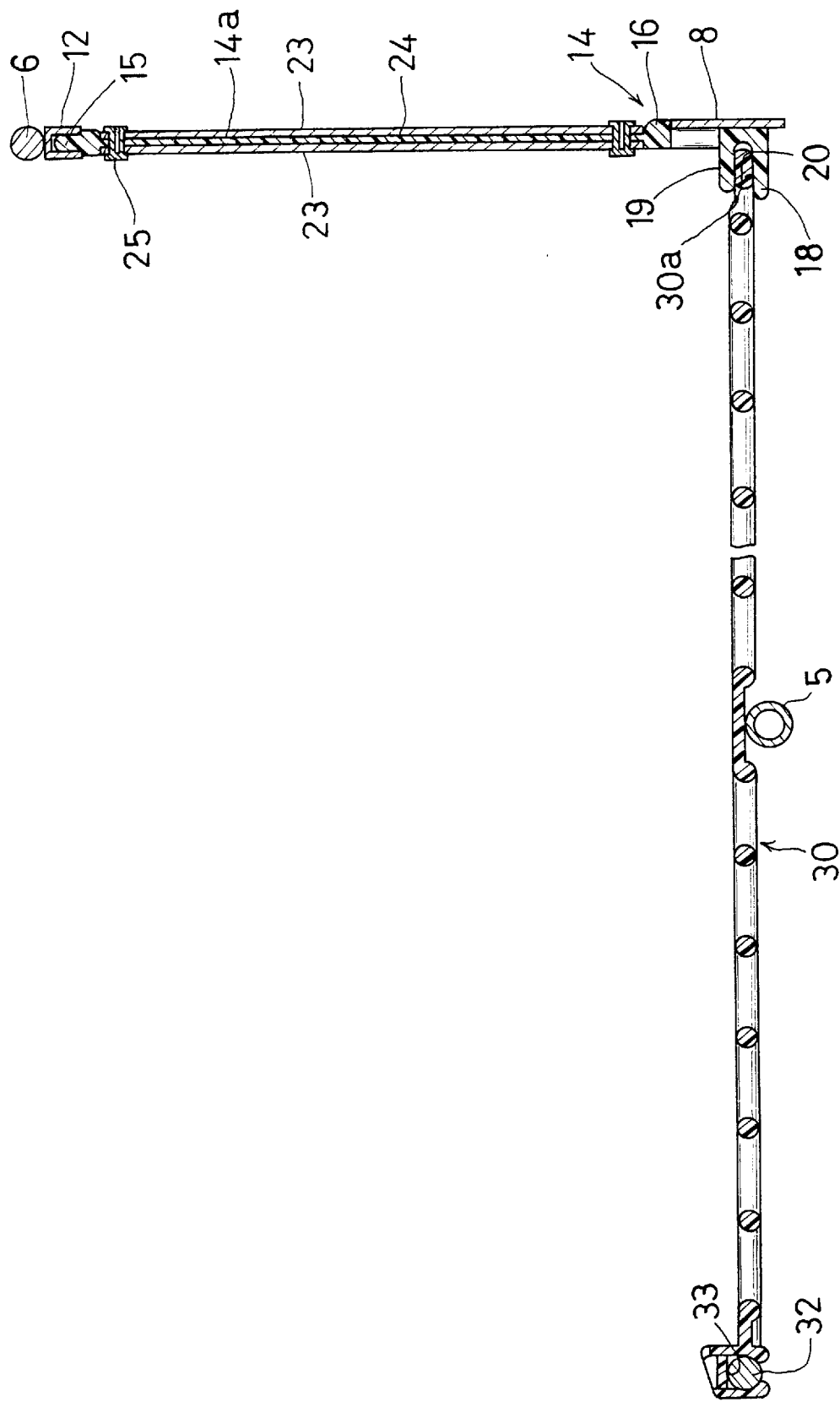
FIG. 8 is a cross sectional view illustrating the side panel member and the bottom panel member fitted to the basket supporting frame.

Referring to FIGS. 7 and 8, an engaging groove 22 of a rounded cross section vertically extends in the outer surface of the first wall 14a of each side panel member 14, into which the corresponding front arms 10a can be fitted. Recessed areas 24 are respectively formed in the inner and outer surfaces of the first wall 14a of each side panel member 14 by making a predetermined area of the first wall 14a thinner than the residual area, in such a manner as to define inner and outer unitary rectangular panel receiving portions, when the side panel members 14 are coupled together. A pair of coupling plates 23, each having substantially the same outline as the unitary panel receiving portion, are respectively fitted to the unitary panel receiving portion defined by the recessed areas 24 to couple a pair of the side panel members 14 together via their first walls 14a.

By defining the recessed area 24, the coupling plates 23 are unlikely to slip from a predetermined position. In addition, the coupling plates 23 do not protrude outwardly and inwardly from the first walls 14a so that the front wall 7a of the basket can substantially evenly surfaced. However, the recessed areas 24 for receiving the coupling plates 23 may be omitted from the first walls 14.

When the coupling plates 23 are fitted in position, a plurality of through-holes 25 are defined by the coupling plates 23 and the first walls 14a of the side panel members 14, through which conventional tightening members (not shown) pass for tightening the two coupling plates 23. The side panel members 14 are thus clamped by the coupling plates 23 and securely coupled together.

Figure 9:
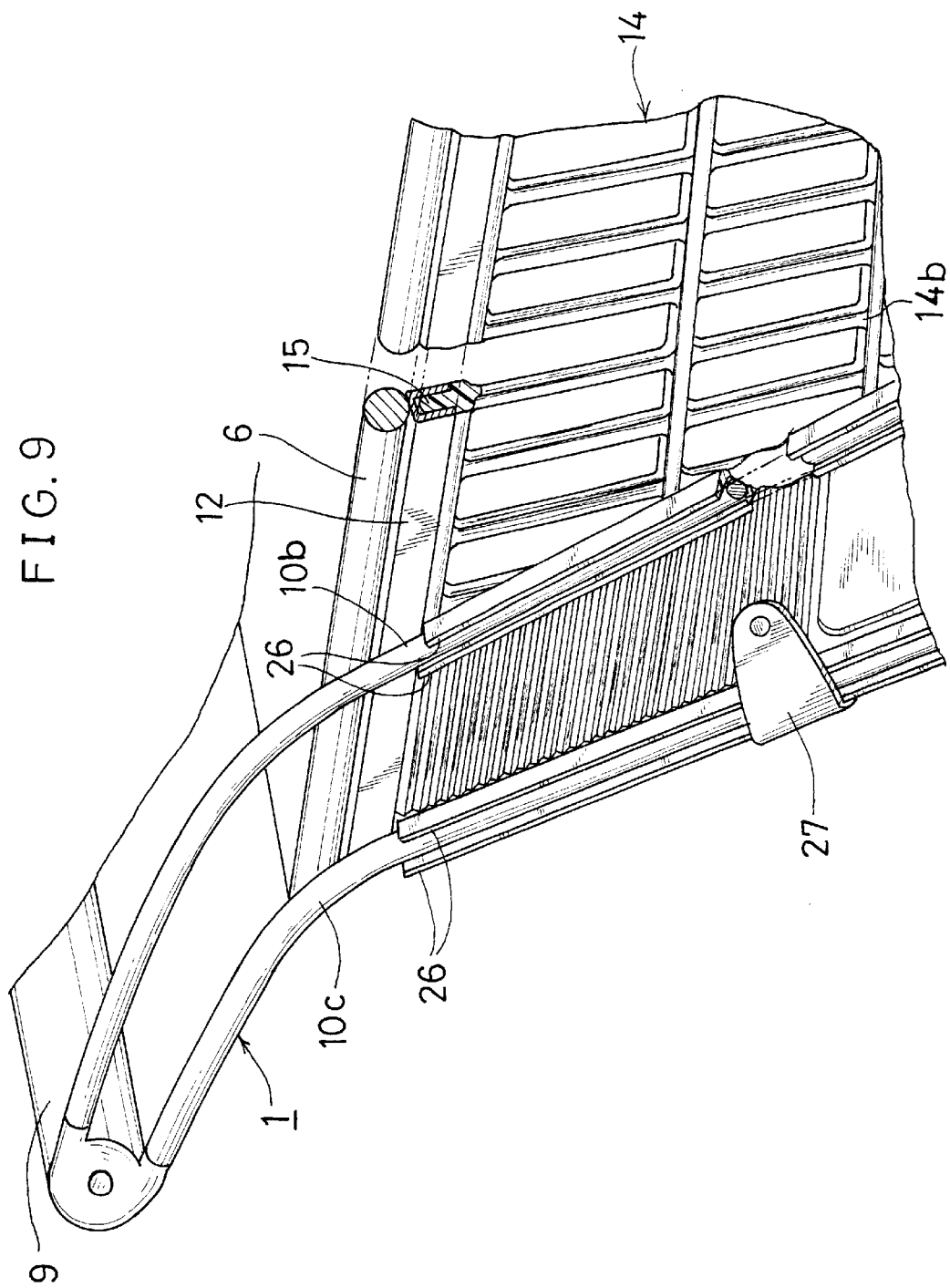
FIG. 9, on a somewhat larger scale, is a fragmentary, perspective view illustrating a gripping member and a strip attached to a supporting arm.

Referring to FIG. 9, a pair of gripping members 26, each of which is formed of two linear protrusions to define an engageable groove of a rounded cross section, is fixed to an outer surface of the second wall 14b of each side panel member 14 in such a manner as to grip the corresponding middle and rear arms 10b and 10c via their grooves, when the side panel member 14 is fitted to the basket supporting frame 7.

Figure 10:
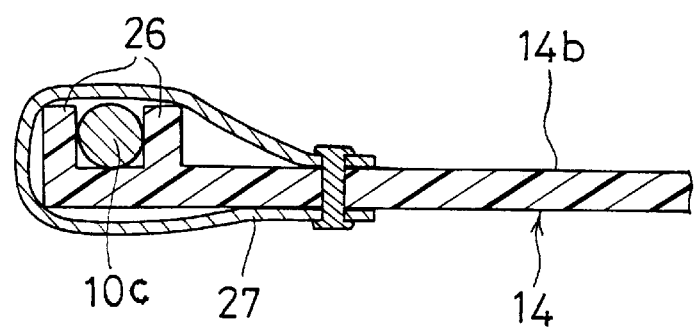
FIG. 10 is a cross sectional view of the strip fixed to the supporting arm.

Each gripping member 26 for gripping the corresponding rear arm 10c is provided with a generally oblong flexible fixing strip 27. Referring to FIG. 10, the fixing strip 27 is wound around the corresponding gripping member 26, and tightens the rear arm 10c within the gripping member 26 via a conventional tightening member, for example, a rivet, a combination of a bolt and nut, and pin, which is insertable into a through-hole defined by the opposite ends of the fixing strip 27 and the side panel member 14. Thereby, the fixing strip 27 arrests the movement of the rear arm 10c from the gripping member 26, with the result that the side panel member 14 is unlikely to drop from the basket supporting frame 7.

Referring to FIGS. 5 and 8, a plastic bottom panel member 30 is formed in such a manner as to snugly fit via its peripheral edge into the engaging concave 20 between the auxiliary bottom extension 18 and the inward extension 19, and become tolerable against a certain given load from the article placed in the basket. The bottom panel member 30 is further provided along its rear edge with a detent member 33 of a generally U cross section open to the downside, into which the rearmost bottom-panel receiving bar 32 is fitted. The bottom panel member 30 may be provided with two or more detent members 33 for replacing the cut-outs 29, so that the residual bottom-panel receiving bars 32 are fitted thereinto.

A method of assembling the basket in accordance with the above arrangement will be described herein.

1. The flange 15 of the side panel member 14 is fitted into the side-panel fitting member 12 of the upper horizontal frame 6 until the horizontal surface 17a of the shoulder 17 abuts against the lower edge 12a of the side-panel fitting member 12, as illustrated in FIGS. 5 and 8. As being outwardly bent, the side panel member 14 is brought into a position, so that the protrusion 16 rests on the upper edge 8a of the lower horizontal frame 8. A pair of the side panel members 14 are thus fixed to the basket supporting frame 7. The flange 15 of the side panel member 14 is shaped in such a manner as to define a clearance between an upper end thereof and the inner and top surface of the side-panel fitting member 12 in the fitting state. The front arms 10a are fitted into the respective engaging grooves 22.

2. The gripping members 26 of each side panel member 14 respectively grip the middle and rear arms 10b and 10c. The fixing strip 27 is wound around the rear arm 10c and tightened to the same by riveting via the through-hole, as illustrated in FIG. 9. Thus, the rear portions of the side panel members 14 are rigidly fixed in position.

3. The bottom panel member 30 is first fitted into the engaging concaves 20 of the second walls 14b of the side panel member 14 via its lateral side edges. Then, the detent member 33 of the bottom panel member 30 is brought into a fitting engagement with the rearmost bottom-panel receiving bar 32, as illustrated in FIGS. 5 and 8. A front edge 30a of the bottom panel member 30 is fitted into the engaging concave 20 of the first walls 14a of the side panel members 14. The bottom panel member 30 is thus securely held within the basket supporting frame 7 via its entire periphery by the engaging concaves 20 of the side panel members 14 and the bottom-panel receiving bar 32. In this state, since the side panel members 14 are pressed towards the outside of the basket supporting frame 7 by the fitting of the bottom panel member 30, an inward force effected by the side panel members 14 acts on the bottom panel member 30. Thereby, the bottom panel member 30 is unlikely to partially or entirely drop from any fitted portions.

4. The two coupling plates 23 are respectively attached to the unitary panel receiving portion defined by the recessed areas 24 in the inner and outer sides of the first walls 14a of the side panel members 14, and rivetted together via the through-holes 25. The side panel members 14 are thus coupled together by clamping their first walls 14a via these coupling plates.

5. The protecting members 34 are respectively attached to the front curving corners 6a of the upper horizontal frame 6.

The order of the above steps from Item 2 to 5 may be varied by a user.

The shopping cart in accordance with the present invention can easily be assembled since at least the front and lateral side walls 7a and 7b of the basket are made of plastic, while avoiding any problems associated with the shopping cart made of metal. In addition, the shopping cart of the present invention does not need the die of the slide core type for molding the side panel member 14 or the like, which may be required for manufacturing the conventional plastic basket. This arrangement enables the shopping cart to be easily manufactured by the reduced number of parts. As a further advantage, since the side panel member 14 is provided with the flange 15 which can easily be fitted into the side-panel fitting member 12, the assembling thereof can also easily be performed.

Figure 11:
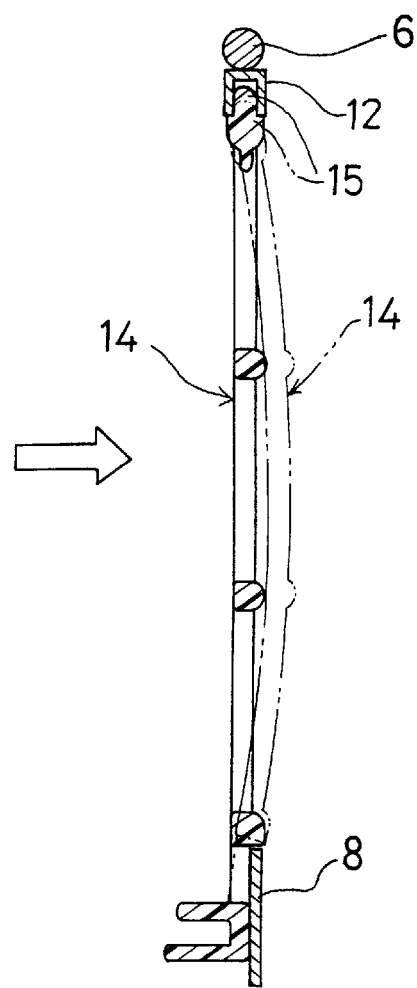
FIG. 11 is a cross sectional view of the side panel member having a flange, but not having a shoulder below the flange.
Figure 12:
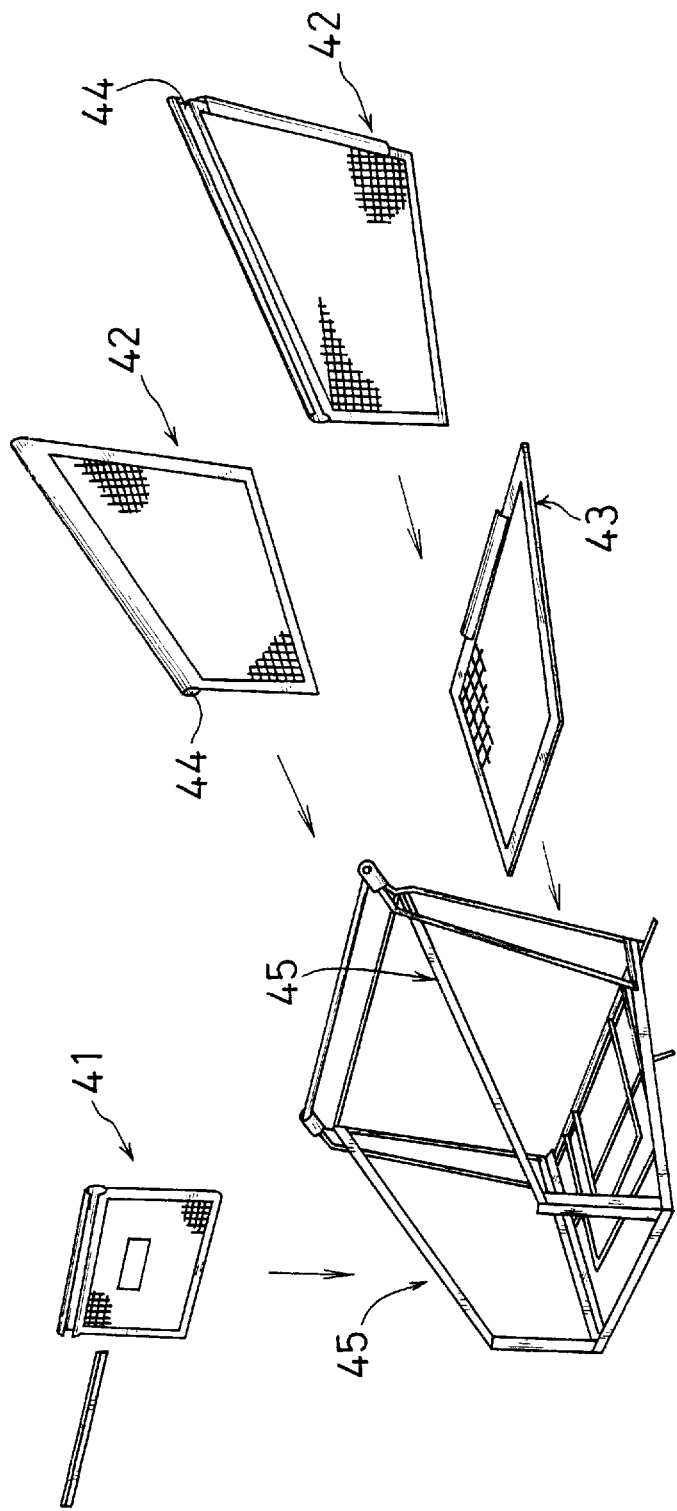
FIG. 12 is a perspective view of a conventional shopping cart.

Since the shoulder 17 with the horizontal surface 17a, which protrudes outwardly and inwardly from the side panel member 14, abuts against the lower edge 12a of the side-panel fitting member 12, the side panel member 14 is unlikely to be bent, even if the outside force is applied to the side panel members 14. This advantage will be verified by comparing the side panel member of this arrangement to the side panel member 14 without the shoulder 17. In FIG. 11, when the outside force, which is indicated by the arrow, is applied thereto, the side panel member 14 is outwardly bent, and the upper portion thereof is pulled downwardly as indicated by the two-dot chain lines.

Although, the shoulder 17 has the above advantage, it is not essential to form the shoulder 17 on the side panel member 14 of the present invention.

In forming the engaging concave 20, the auxiliary bottom extension 18, which extends vertically and inwardly from the side panel member 14, preferably has a relatively large surface. Therefore, it is unlikely that the bottom panel member 30 drops from the engaging concave 20, even if a relatively heavy load is given from the article or the like. By clamping the middle and rear arms 10b, 10c with the respective gripping members 26, and tightening the rear arm 10c within the gripping member 26 via the fixing strip 27, the side panel member 14 can more securely be fixed to the basket supporting frame 7.

The coupling plates 23, which couple a pair of the side panel members 14 together, also function as a means for covering the first walls 14a of the side panel members 14, and therefore concealing somewhat obstacle parts or edges of the side panel members 14. Thereby, articles on a shelf of a store, or the like is hardly damaged with these portions. In addition, the coupling plates 23 can also display information such as an advertisement, or other written messages thereon. The protecting members 34 protect the front curving corners 6a of the upper horizontal frame 6, which are frequently subject to damages.

A conventional cart having a basket which is separable into four vertical side panel members and a bottom panel member, inherently has right-angled connected portions between the panel members. On the contrary, since the side panel member 14 of the present invention includes a gradually curving corner 14e between the first and second walls 14a and 14b, it is unlikely to damage the article on a display stand or the like, even if it hits against the same. This arrangement is effective since the gradually curving corners 14e are positioned in the front of the basket, through which the shopping cart sometimes hits against the display stand or the like.

In the above embodiment, a pair of the side panel members 14 are preferably structurally symmetrical, since it is not necessary to prepare a relatively large die for molding the side panel member 14 with the first wall 14a larger than that of the opposite side panel member 14, which has to be made when the symmetrical arrangement is not employed. However, this symmetrical arrangement is not essential in the present invention.

Although, the side panel members 14 and the bottom panel member 30 are latticed in the above embodiment, a geometrical pattern, for example, an oval, circle and triangle, letters or other designs may be employed by punching or other conventional manners, since the side panel member 14 is made of plastic. This patern variation renders the basket more attractive in design than the metal basket.

The bottom panel member 30, which is made of plastic in the above embodiment, may be made of metal, since the bottom panel member 30 is of a substantially flat shape, which allows the bottom panel member 30 to be manufactured by a machine in a cheap manner.

The protrusion 16 or the shoulder 17 may be varied in shape, provided that it can be held by the side-panel fitting member 12 or the lower horizontal frame 8. The side-panel fitting member 12, which is separably made and fixed to the downwardly facing surface of the upper horizontal frame 6 in the above embodiment, may integrally be formed in the upper horizontal frame 6. Further, the protrusion 16 and the shoulder 17, which are continuously formed along the upper edge 14c and the lower edge 14d respectively in the above embodiment, may discontinuously be formed.

Instead of the band-like plate, a pipe, a C-shaped steel or the like may be employed to make the lower horizontal frame 8.

This specification is by no means intended to restrict the present invention to the preferred embodiments set forth therein. Various modifications to the shopping cart, basket vertical side wall, and method of the present invention, as described herein, may be made by those skilled in the art without departing from the spirit and scope of the present invention as defined in the appended claims.

What is claimed is:

1. A shopping cart having a basket comprising:
   a cart body including a wheeled chassis and a basket supporting frame mounted to said wheeled chassis;
   said basket supporting frame including an upper horizontal frame for holding an upper edge of said basket, a lower horizontal frame for holding a lower edge of said basket and a frame supporting member for supporting said upper and lower horizontal frames in position;
   a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
   wherein said side panel members are structurally symmetrical so that said first wall of each of said side panel members makes up a half of said front wall of said basket.

2. The shopping cart as set forth in claim 1, wherein said frame supporting member comprising at least two supporting arms, which are respectively connected to opposite lateral sides of said basket supporting frame, extending upwardly from the lower horizontal frame to the upper horizontal frame.

3. The shopping cart as set forth in claim 1, wherein said side panel members are fitted to said basket supporting frame via a fitting means.

4. A shopping cart having a basket comprising:
   a cart body including a wheeled chassis and a basket supporting frame mounted to said wheeled chassis;
   said basket supporting frame including an upper horizontal frame for holding an upper edge of said basket, a lower horizontal frame for holding a lower edge of said basket and a frame supporting member for supporting said upper and lower horizontal frames in position;
   a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
   wherein said side panel members are fitted to said basket supporting frame via a fitting means, and
   said fitting means comprises a flange formed along an upper edge of each of said side panel members and a side-panel fitting member formed along a downwardly facing surface of said upper horizontal frame, said side-panel fitting member defining a space for snapfitting said flange.

5. The shopping cart as set forth in claim 4, wherein each of said side panel members is provided on a lower portion thereof with an outward protrusion for resting on an upper edge of said lower horizontal frame.

6. The shopping cart as set forth in claim 4, wherein each of said side panel members is provided in a lower portion thereof with an inward engaging concave, into which said bottom panel member is fittable.

7. The shopping cart as set forth in claim 6, wherein a shoulder is formed below said flange for abutting against a lower edge of said side-panel fitting member.

8. The shopping cart as set forth in claim 1, wherein each of said side panel members is provided on a lower portion thereof with an outward protrusion for resting on an upper edge of said lower horizontal frame.

9. A shopping cart having a basket comprising:
a cart body including a wheeled chassis and a basket supporting frame mounted to said wheeled chassis;
said basket supporting frame including an upper horizontal frame for holding an upper edge of said basket, a lower horizontal frame for holding a lower edge of said basket and a frame supporting member for supporting said upper and lower horizontal frames in position;
a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
wherein each of said side panel members is provided in a lower portion thereof with an inward engaging concave, into which said bottom panel member is fittable.

10. A shopping cart having a basket comprising:
a cart body including a wheeled chassis and a basket supporting frame mounted to said wheeled chassis;
said basket supporting frame including an upper horizontal frame for holding an upper edge of said basket, a lower horizontal frame for holding a lower edge of said basket and a frame supporting member for supporting said upper and lower horizontal frames in position;
a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
wherein said bottom panel member is provided with a detent member fittable over a bottom-panel receiving bar which extends between opposite lateral sides of said lower horizontal frame so that said bottom panel member is placed in position.

11. The shopping cart as set forth in claim 1, wherein each of said side panel member s is provided with a gripping member for gripping said respective supporting arm of said basket supporting frame.

12. The shopping cart as set forth in claim 11, wherein each of said side panel members is provided with a means for arresting the movement of the supporting frame from said gripping member.

13. The shopping cart as set forth in claim 12, wherein said arresting means comprises a strip which is wound around said gripping member and said supporting frame and tightens the same together.

14. A shopping cart having a basket comprising:
a cart body including a wheeled chassis and a basket supporting frame mounted to said wheeled chassis; and
a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
wherein a pair of said side panel members are coupled together via a pair of coupling plates which are respectively attached to inner and outer surfaces of said first wall of said side panel member and tightened by a tightening member.

15. A shopping cart having a basket comprising:
a cart body including a wheeled chassis and a basket supporting frame mounted to said wheeled chassis;
said basket supporting frame including an upper horizontal frame for holding an upper edge of said basket, a lower horizontal frame for holding a lower edge of said basket and a frame supporting member for supporting said upper and lower horizontal frames in position;
a plurality of discrete panel members fittable to said basket supporting frame for making up said basket, said panel members including a pair of side panel members and a bottom panel member, each of said side panel members including a first wall and a second wall which are integrally made of plastic in such a manner as to have a generally L-shape in plan, wherein said first wall makes up a part of a front wall of said basket, said second wall makes up a lateral side wall thereof, and said bottom panel member makes up a bottom wall thereof,
wherein a pair of said side panel members are coupled together via a pair of coupling plates which are respectively attached to inner and outer surfaces of said first wall of said side panel member and tightened by a tightening member.

16. A method of assembling a basket of a shopping cart comprising:
fitting a flange of a pair of side panel members into corresponding side-panel fitting members of an upper horizontal frame of a basket supporting frame from inside of said basket supporting frame, said basket supporting frame including said upper horizontal frame, a lower horizontal frame and a frame supporting member;
placing an outward protrusion of each side panel member on a corresponding upper edge of said lower horizontal frame, and pushing said side panel members outwardly to fix said side panel members to said basket supporting frame;
fitting a peripheral edge of a bottom panel member into an inward engaging concave formed in a lower portion of said side panel member; and
fitting a detent member of said bottom panel member to a bottom-panel receiving bar of a cart body to place said bottom panel member in position.

17. A vertical side wall of a basket for being fitted to a basket supporting frame of a shopping cart comprising a pair of side panel members, each of said side panel members having a first wall and a second wall which are integrally made of plastic in such a manner as to have a generally L-shape in plan, wherein said first wall makes up a part of a front wall of said basket, and said second wall makes up a lateral side wall of said basket, wherein said side panel members are structurally symmetrical so that said first wall of each of said side panel members makes up a half of said front wall of said basket.

18. The vertical side wall as set forth in claim 17, wherein each of said side panel members includes a gradually curving corner between said first and second walls.

* * * * *